Patented Apr. 1, 1930

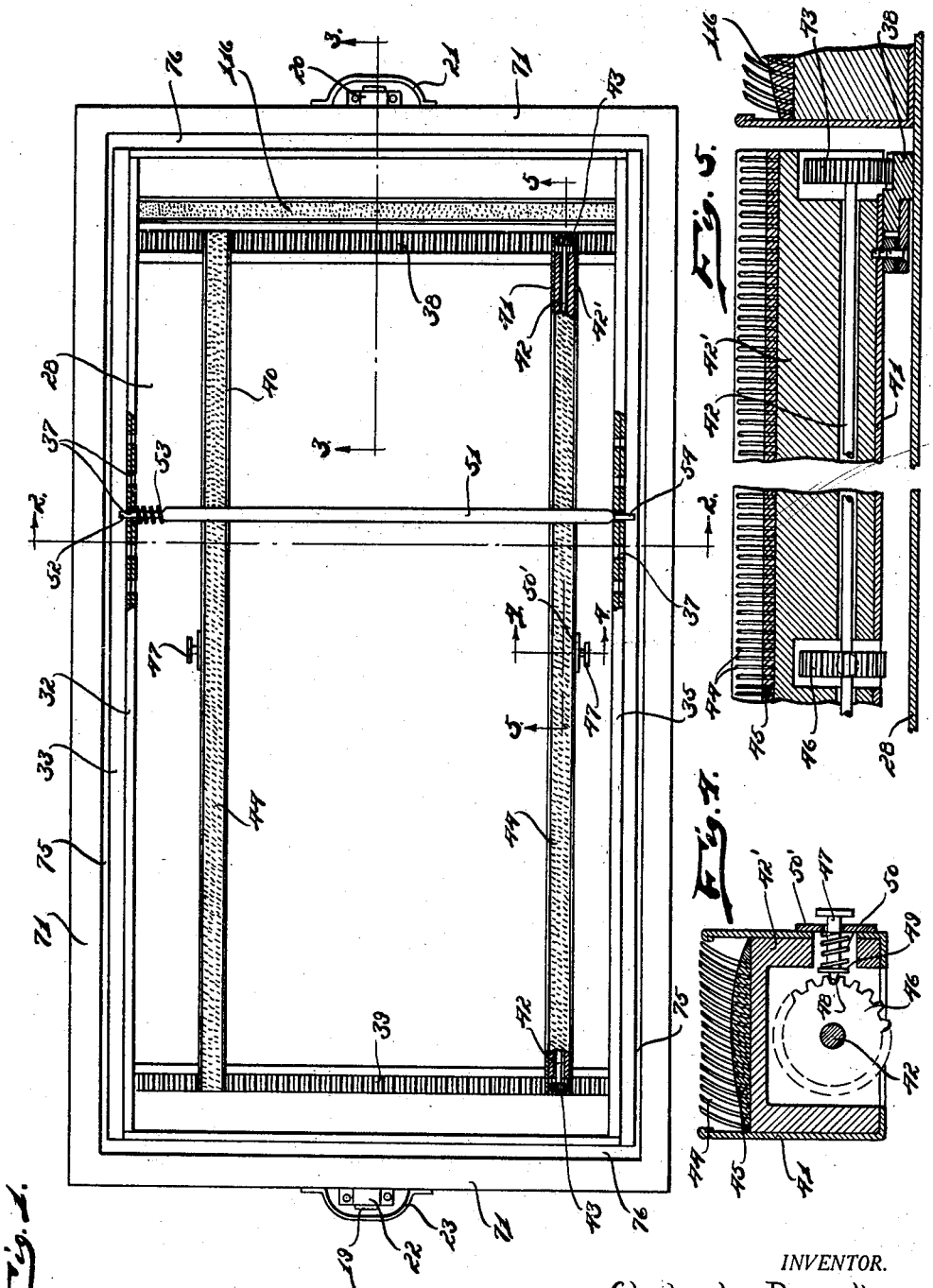

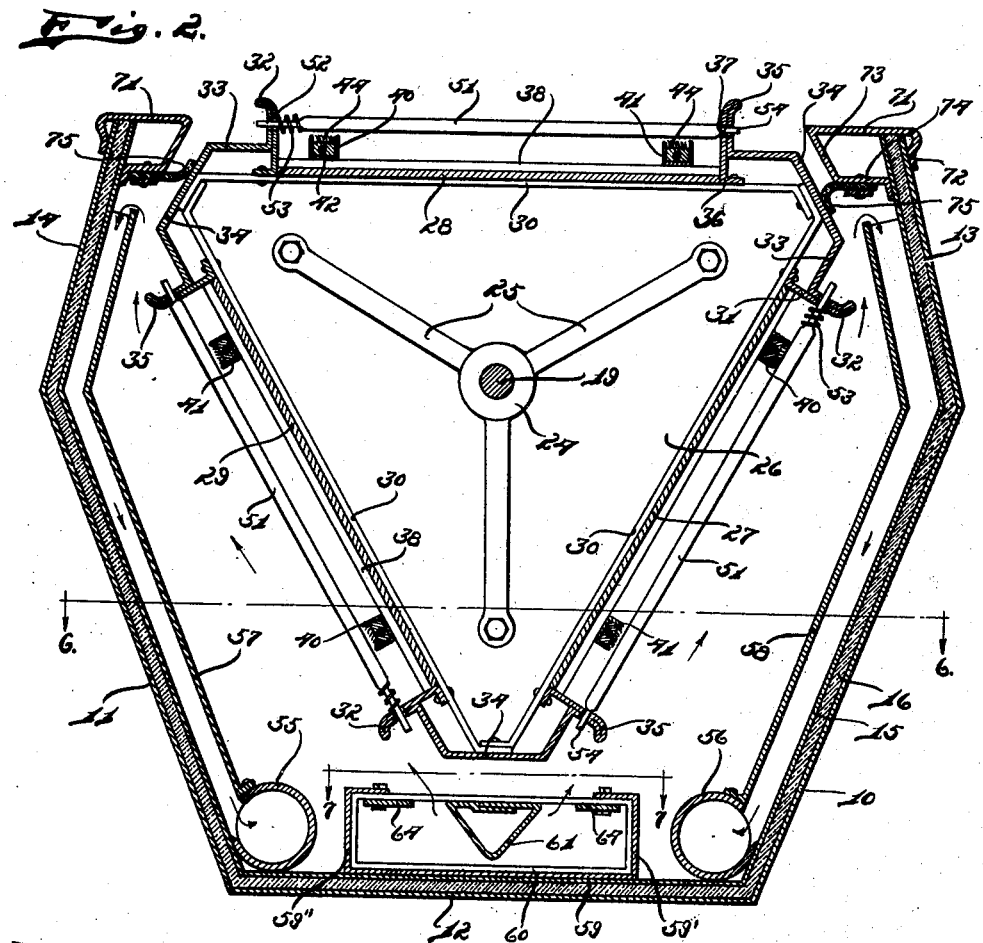
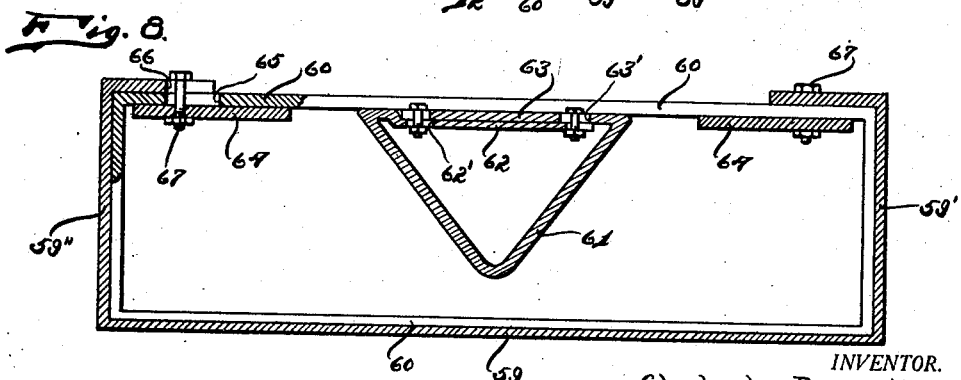

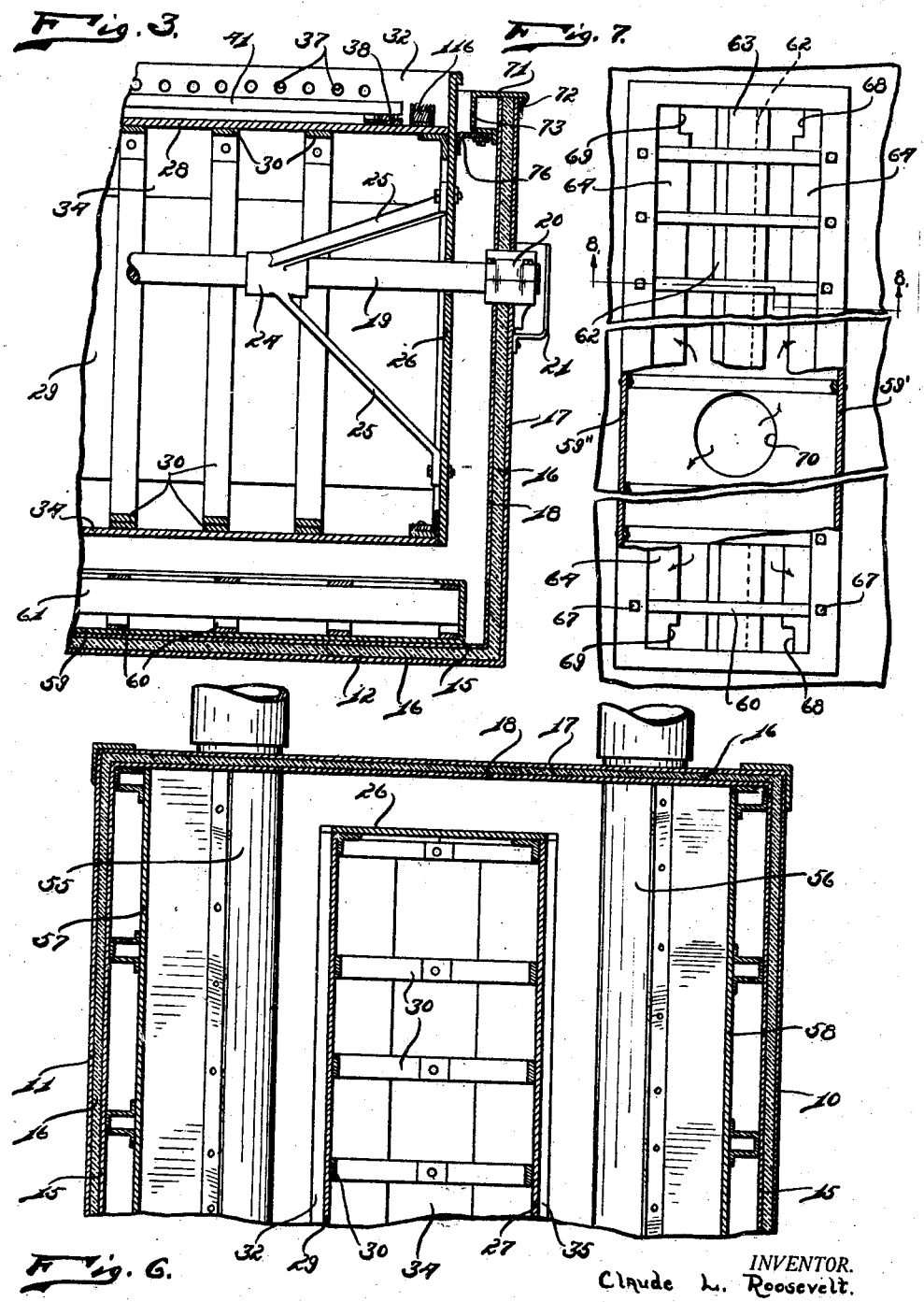
April 1, 1930.
C. L. ROOSEVELT
1,753,025
CURTAIN DRIER AND STRETCHER
Filed May 28, 1928
3 Sheets-Sheet 3
INVENTOR.
Claude L. Roosevelt.
ATTORNEY.

1,753,025

UNITED STATES PATENT OFFICE

CLAUDE L. ROOSEVELT, OF DETROIT, MICHIGAN

CURTAIN DRIER AND STRETCHER

Application filed May 28, 1928. Serial No. 281,010.

My invention relates to a new and useful improvement in a curtain drier and stretcher and has as its object the provision of a device of this kind in which curtains which have been laundered or cleaned may be stretched to the desired shape and size and easily and quickly dried.

Another object of the invention is the provision of curtain engaging means for securing the curtain at its ends and side edges and locking the same in various positions of adjustment.

Another object of the invention is the provision of a rotative curtain bearing member adapted for rotation in a heated chamber provided with means for permitting free rotation of the curtain bearing member and preventing the escape of heated air therefrom.

Another object of the invention is the provision in a curtain drier and stretcher of this class of a novel and effective means of introducing the heated air thereinto and dispensing the same so as to properly be brought against the curtain to be dried.

Other objects will appear hereinafter.

The invention consists in the combination and arrangement of parts hereinafter described and claimed.

The invention will be best understood by a reference to the accompanying drawings which form a part of this specification and in which, Fig. 1 is a top plan view of the invention.

Fig. 2 is a sectional view taken on line 2—2 of Fig. 1.

Fig. 3 is a fragmentary sectional view taken on line 3—3 of Fig. 1.

Fig. 4 is a sectional view taken on line 4—4 of Fig. 1.

Fig. 5 is a fragmentary sectional view taken on line 5—5 of Fig. 1.

Fig. 6 is a fragmentary sectional view taken on line 5—5 of Fig. 1.

Fig. 7 is a view taken on line 7—7 of Fig. 2 with parts shown in section and parts broken away.

Fig. 8 is a view taken on line 8—8 of Fig. 7.

The invention comprises a stationary casing or housing having an outer covering made preferably of metal and comprising a base 12, upwardly inclined side walls 10 and 11, each inclined inwardly at their upper ends to form the side walls 13 and 14. An inner covering for these walls is provided conforming to the contour, this covering 15 being spaced from the covering 10 by suitable insulating material 16 such as asbestos or the like. The end walls comprise the outer covering 17 and the inner covering 18 which are spaced apart by suitable insulating material 16. Extending longitudinally of the casing is a shaft 19 which is journalled in bearings 20 and 22 mounted in the end walls of this casing, a shield 21 covering the bearing 20 and a shield 23 covering the bearing 22. Mounted on the shaft 19 are hubs 24 having legs 25 extending outwardly therefrom and each secured to the end wall 26. In the drawings only one end wall is illustrated in detail as the structure is the same at both ends. This end wall 26 forms a part of a rotatable housing formed from the walls 27, 28 and 29 so that this housing, which is rotatable in the outer housing, is substantially triangular in cross section. These walls 27 are mounted on a number of frames formed from the straps 30. A closure is provided for the apices of this triangular structure and at the end of the wall 27, as shown in Fig. 2, there is secured to the straps 30 an outwardly projecting plate 31 which is doubled upon itself to provide the flange 32. This plate is again angularly turned as at 33 and 34 and again provided with a flange 35, the other end 36 of this plate being secured to one of the straps 30. The arrangement is the same at each of the apices so that a detailed description of one will suffice for both.

Formed in the flanges 32 and 35 are spaced openings 37, the purpose of which will appear herein.

Mounted transversely of the wall 28, at opposite ends thereof, are rack bars 38 and 39. Extending longitudinally of the triangular housing are channel irons 40 and 41. Positioned in these channel irons are blocks 42', extending longitudinally of which is a shaft 42 carrying at each end a gear or pinion 43 adapted to mesh with the teeth of the rack bar 38 or 39, the channel iron being cut away at its lower side for permitting the engagement of the gear with the rack bar. Mounted on the upper surface of the block 42' is a pad 45, secured to and projecting upwardly from which are a plurality of pins or other securing means 44. Fixedly mounted on the shaft 42, intermediate its ends, is a gear 46. Extended inwardly of the channel irons 41 and 40 and through the blocks 42' is a plunger 47 having a reduced inner end 48 adapted to engage between the teeth of the gears 46. Fixedly mounted on the plunger 47 is a collar 49 engaging against one end of a spring 50, the other end of which engages the plate 50' secured to the outer surface of the channel 40 or 41. The spring 50 normally retains the plunger pressed inwardly into engagement with the teeth of the wheel 46 so as to normally prevent rotation of the shaft 42 upon which the pinions 43 are fixedly mounted.

A supporting rod 51 is used with the invention and has an elongated reduced portion 52 at one end embraced by the spring 53. At the opposite end is the shorter reduced portion 54.

In operation, when it is desired to place a curtain on the support, the curtain is secured to the rod 51 and this rod inserted into, at its opposite ends, the openings 37 in the flanges already mentioned. The plungers 47 are then withdrawn until the channels 40 and 41 are brought to the proper width for accommodating the curtain, this width being dependent upon the size of the curtain.

The slots 37 in which the rod 51 engages is also dependent upon the length of the curtain, a pin bearing bar 116 being extended transversely of the frame at one end. When the channels 41 and 40 are brought to their proper width, the plunger will serve to lock these members in position so that the curtain is retained in stretched taut position firmly upon the frame.

Positioned in the outer housing at the lower portion thereof and extending longitudinally of the housing, are conduits 55 and 56, each open at one side and communicating with a space lying between the inner covering 15 and the upwardly extending guard plates 57 and 58.

Mounted on the base of the inner covering and extending longitudinally of the outer housing is a housing 59 having its top open, this housing comprising but the base and opposite side walls 59' and 59'', each of which has its edge turned inwardly. Frames 60 made from suitable strap metal are secured on the inner surface of the housing at spaced intervals for reinforcing purposes. Suspended from the upper rail of the frames 60 and extending longitudinally of the housing 59 is a trough-shaped member 61 which is triangular in cross section and has its ends 62 and 63 overlapping and secured by bolts projected through slots 63' and 62' so that the size of this trough may be adjusted.

Secured to the frame 60 and to the angularly turned edges of the side walls 59' and 59'' by means of suitable bolts 67 projected through the slots 65 and 66 are plates 64, these slots being used to afford an inward and outward adjustment of the plates 64 relatively to each other, these plates being secured at opposite sides of the housing 59. As shown in Fig. 7, the ends of the plates 64 are cut away as at 68 and 69 to permit a ready passage of the heated air at the ends of the housing.

Leading through the base of the covering 12 and through the insulation 16 and the covering 15 and into communication with the housing 59, preferably centrally thereof, is an opening 70 leading to which is a conduit delivering heated air into the housing, this conduit not being shown as it may be connected to any well known type of blower and heating mechanism.

The covering 71 is provided with the upper edges of the outer housing having one edge 72 turned downwardly to engage the covering 10 and the other side 73 angularly turned downwardly and provided with the angularly turned portion 74. Secured to this angularly turned portion 74 and projecting outwardly therefrom is a strip 75 formed from felt, leather or other suitable flexible sealing material.

In operation, after the curtain has been secured to the frame as desired, the triangular-shaped housing may be rotated on the shaft 19 as an axis so that when one curtain is fastened to the frame, the same may be rotated into the interior of the outer housing. This will bring one of the frames into the upper position shown in Fig. 2 so that the curtain may be removed therefrom and replaced with a new one, upon which a turning of the triangular-shaped housing another section may be effected. The heated air or superheated steam entering the housing 59 is deflected by the trough-shaped members 61 into the direction of the arrows shown in Fig. 2 passing upwardly and thence downwardly in the space between the guard plates 57 and 58 and the covering 15 and outwardly from the conduits 55 and 56.

In operation, it has been demonstrated that when the air is of sufficient humidity and raised to a sufficiently high temperature a curtain will be dried as quickly as they can be removed and replaced, so that a constant feeding of the curtains into the outer housing takes place.

By adjusting the plates 64 the space between the inner edges of the plates 64 and the edges of the trough-shaped member 61 will be determined, so as to regulate the amount of air passing therethrough. Also by adjusting the ends 62 and 63 of this triangular-shaped deflecting member 61, the direction of the currents of air will be determined so that the current of air will always pass along the outer surface of the curtain rather than the inner surface, as it has been demonstrated that to direct the current of air in this location will effect a quicker drying and provide a curtain, when dried, of the best appearance.

By sealing with the flexible members 75 and 76, which engage the end walls of the triangular-shaped housing, an escape of air is reduced to a minimum and the convenience of the operator considerably enhanced.

While I have illustrated and described the preferred form of my invention, I do not wish to limit myself to the precise details of structure shown, but desire to avail myself of such variations and modifications as come within the scope of the appended claims.

Having thus described my invention, what I claim as new and desire to secure by Letters Patent is:

1. In a curtain stretcher and drier: an outer casing; fluid distributing means in said casing at the lower side thereof and communicating, exteriorly thereof, through an opening; outlet conduits in said casing communicating with the interior of said casing, adjacent the upper side thereof; a curtain supporting member rotatably mounted in said casing; and means for sealing said casing at the sides of said supporting member for preventing escape of fluid therefrom.

2. In a curtain stretcher and drier of the class described: a casing having an opening formed therein; a housing positioned in said casing and provided with an opening in its base registering with the opening in said casing; reinforcing frames extended transversely of said housing at spaced intervals; a triangular-shaped distributing member extended centrally axially of said housing and mounted on said frames, the ends of said distributor being overlapped and adapted for relative movement for adjusting the size of said distributor; a longitudinally extended plate at each side of said housing at the upper portion thereof and movable inwardly and outwardly of the longitudinal edges of said distributor.

3. In a device of the class described: an outer casing; fluid distributing means in said casing adjacent the lower side thereof and communicating through an opening with the exterior thereof; outlet conduits in said casing communicating with the interior of said casing adjacent the upper side thereof, said casing being opened at its upper side; a supporting member rotatably mounted in said casing; and means cooperating with said casing for sealing said casing at the sides of said supporting member and closing the open end of said casing for preventing escape of fluid therefrom.

In testimony whereof I have signed the foregoing specification.

CLAUDE L. ROOSEVELT.